US012687411B2

(12) United States Patent
Horie et al.

(10) Patent No.: US 12,687,411 B2
(45) Date of Patent: Jul. 21, 2026

(54) GRIPPING DETECTION DEVICE AND STEERING DEVICE

(71) Applicant: ALPS ALPINE CO., LTD., Tokyo (JP)

(72) Inventors: Kazuma Horie, Miyagi (JP); Takeshi Masaki, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 193 days.

(21) Appl. No.: 18/738,503

(22) Filed: Jun. 10, 2024

(65) Prior Publication Data

US 2024/0328832 A1      Oct. 3, 2024

Related U.S. Application Data

(63) Continuation of application No. PCT/JP2022/044763, filed on Dec. 5, 2022.

(30) Foreign Application Priority Data

Dec. 27, 2021      (JP) ................................. 2021-212504

(51) Int. Cl.
*G01D 5/24* (2006.01)
*B62D 1/06* (2006.01)

(52) U.S. Cl.
CPC *G01D 5/24* (2013.01); *B62D 1/06* (2013.01)

(58) Field of Classification Search
None
See application file for complete search history.

(56) References Cited

U.S. PATENT DOCUMENTS

| | | | |
|---|---|---|---|
| 2016/0004367 A1 | 1/2016 | Shimada | |
| 2019/0210629 A1 | 7/2019 | Kwon et al. | |
| 2020/0377138 A1* | 12/2020 | Saburi | A61B 5/318 |
| 2021/0371001 A1 | 12/2021 | Osako et al. | |
| 2024/0034387 A1* | 2/2024 | Schneider | B62D 1/065 |
| 2024/0182104 A1* | 6/2024 | Yamazaki | B62D 1/06 |

FOREIGN PATENT DOCUMENTS

| | | |
|---|---|---|
| JP | 2016-016697 | 2/2016 |
| JP | 2022-148332 | 10/2022 |
| KR | 10-2019-0083777 | 7/2019 |
| WO | 2019/202977 | 10/2019 |
| WO | 2020/195620 | 10/2020 |
| WO | 2022/209426 | 10/2022 |

OTHER PUBLICATIONS

International Search Report for PCT/JP2022/044763 mailed on Feb. 21, 2023.

* cited by examiner

*Primary Examiner* — Jas A Sanghera
(74) *Attorney, Agent, or Firm* — IPUSA, PLLC

(57) ABSTRACT

A gripping detection device includes a capacitive sensor part that is provided at a spoke portion of a steering wheel and includes a detection electrode facing a rim portion of the steering wheel; a control part configured to control the capacitive sensor part; and a determination part configured to determine presence or absence of a finger gripping the rim portion based on a hover detection result obtained by the capacitive sensor part. The control part includes a processor, and a memory storing one or more programs, which when executed, cause the processor to: use a core metal of the steering wheel as a shield electrode of the capacitive sensor part.

5 Claims, 9 Drawing Sheets

GRIPPING DETECTION DEVICE AND STEERING DEVICE

CROSS-REFERENCE TO RELATED APPLICATIONS

This application is a continuation application of International Application No. PCT/JP2022/044763, filed on Dec. 5, 2022, and designated the U.S., which is based upon and claims priority to Japanese Patent Application No. 2021-212504, filed on Dec. 27, 2021, the entire contents of which are incorporated herein by reference.

BACKGROUND

1. Field of the Invention

The present disclosure relates to gripping detection devices and steering devices.

2. Description of the Related Art

International Publication No. WO2020/195620 discloses a technique of detecting whether or not a human's hand is in proximity to or in contact with a steering wheel through hover detection of a capacitive sensor provided at a spoke portion of the steering wheel.

SUMMARY

A gripping detection device includes a capacitive sensor part that is provided at a spoke portion of a steering wheel and includes a detection electrode facing a rim portion of the steering wheel; a control part configured to control the capacitive sensor part; and a determination part configured to determine presence or absence of a finger gripping the rim portion based on a hover detection result obtained by the capacitive sensor part. The control part includes a processor, and a memory storing one or more programs, which when executed, cause the processor to: use a core metal of the steering wheel as a shield electrode of the capacitive sensor part.

DETAILED DESCRIPTION OF THE DISCLOSURE

According to the above-described technique of International Publication No. WO2020/195620, the detection value of the capacitive sensor may greatly fluctuate by receiving the influence of noise from a core metal of a rim of the steering wheel, and may be unable to detect the human's hand with high accuracy.

Hereinafter, an embodiment will be described with reference to the drawings.

Configuration of Steering Device 10

Figure 1:
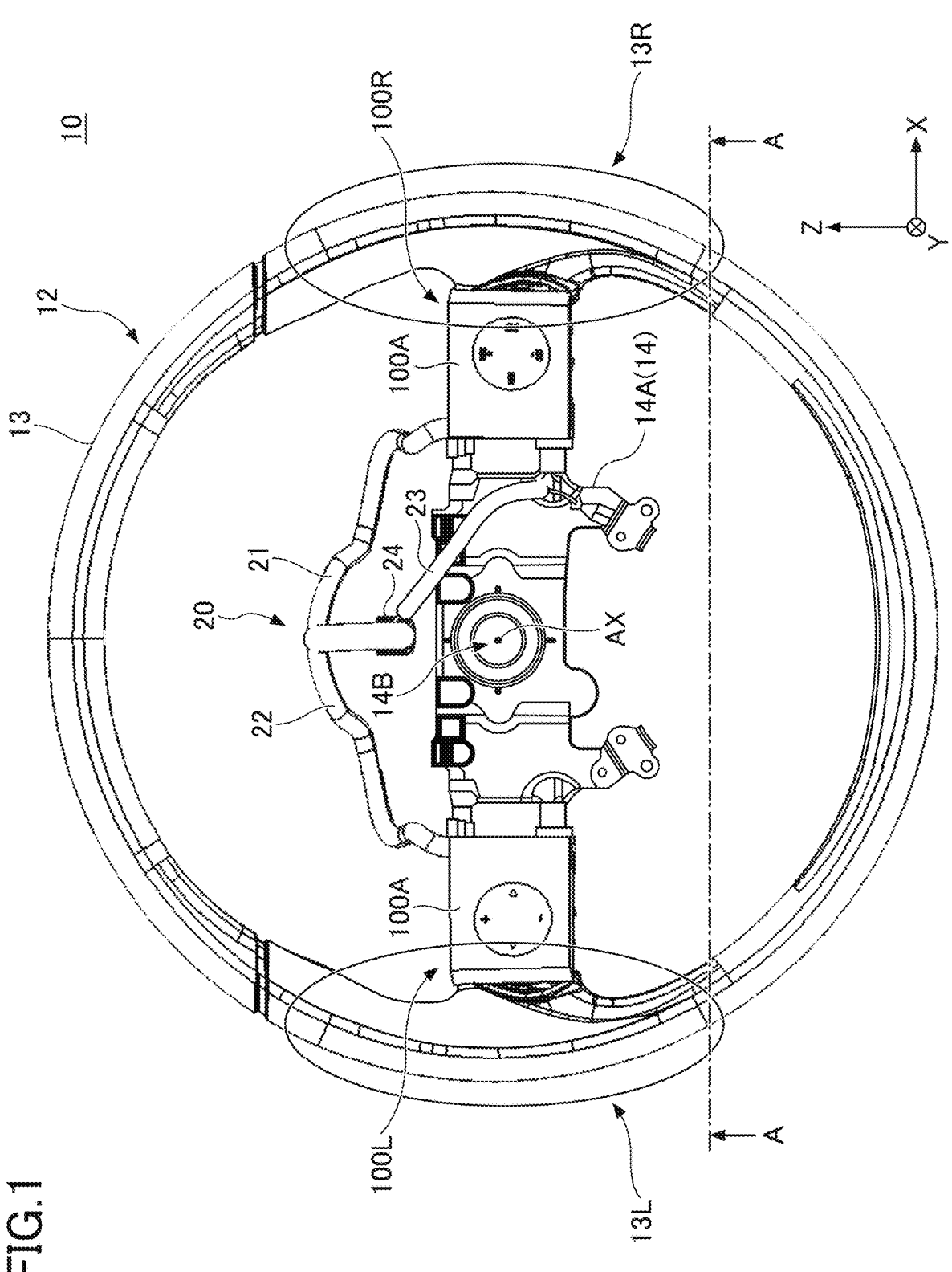
FIG. 1 is a plan view of a steering device according to one embodiment.
Figure 2:
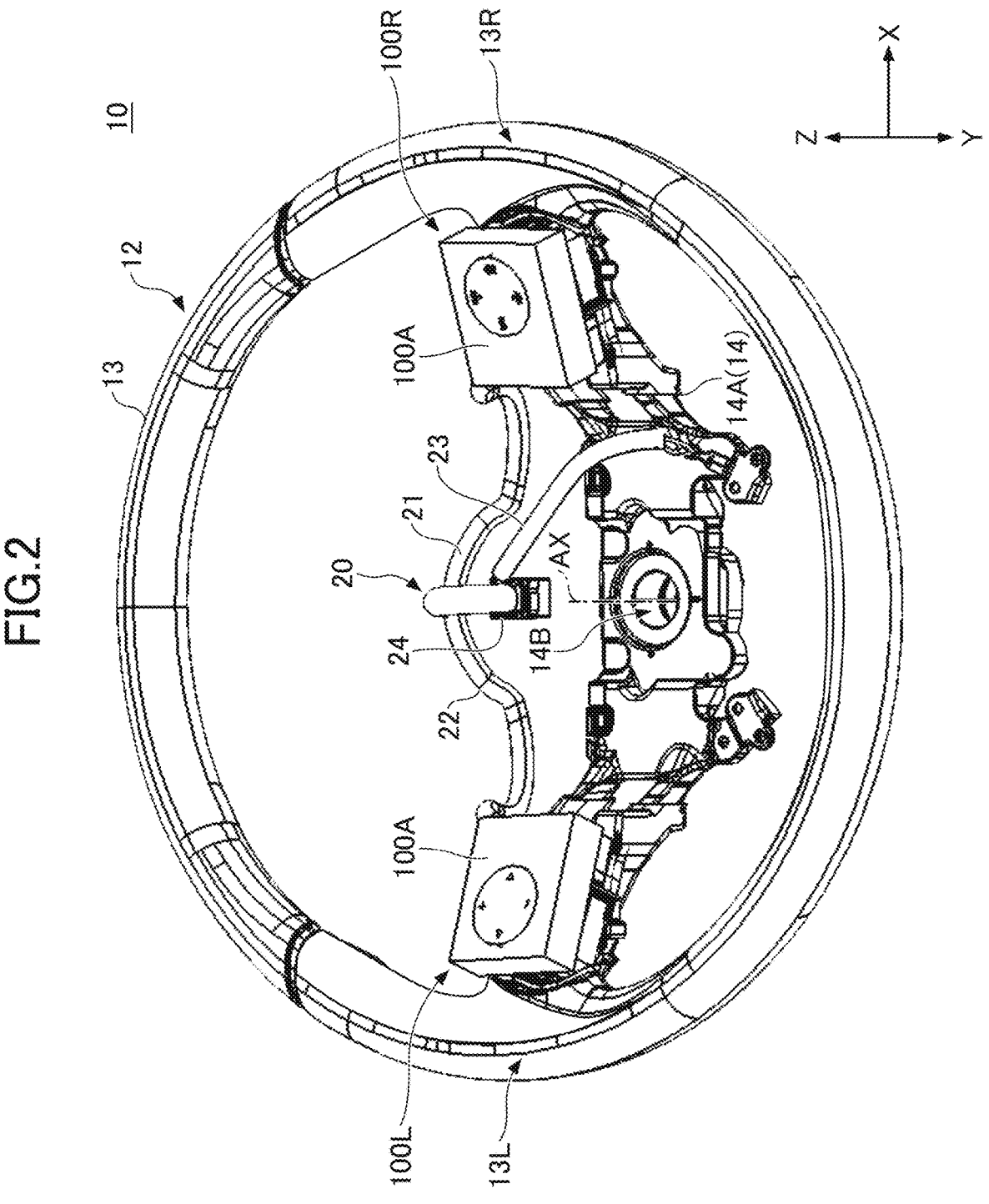
FIG. 2 is a perspective view of an external appearance of the steering device according to one embodiment.
Figure 3:
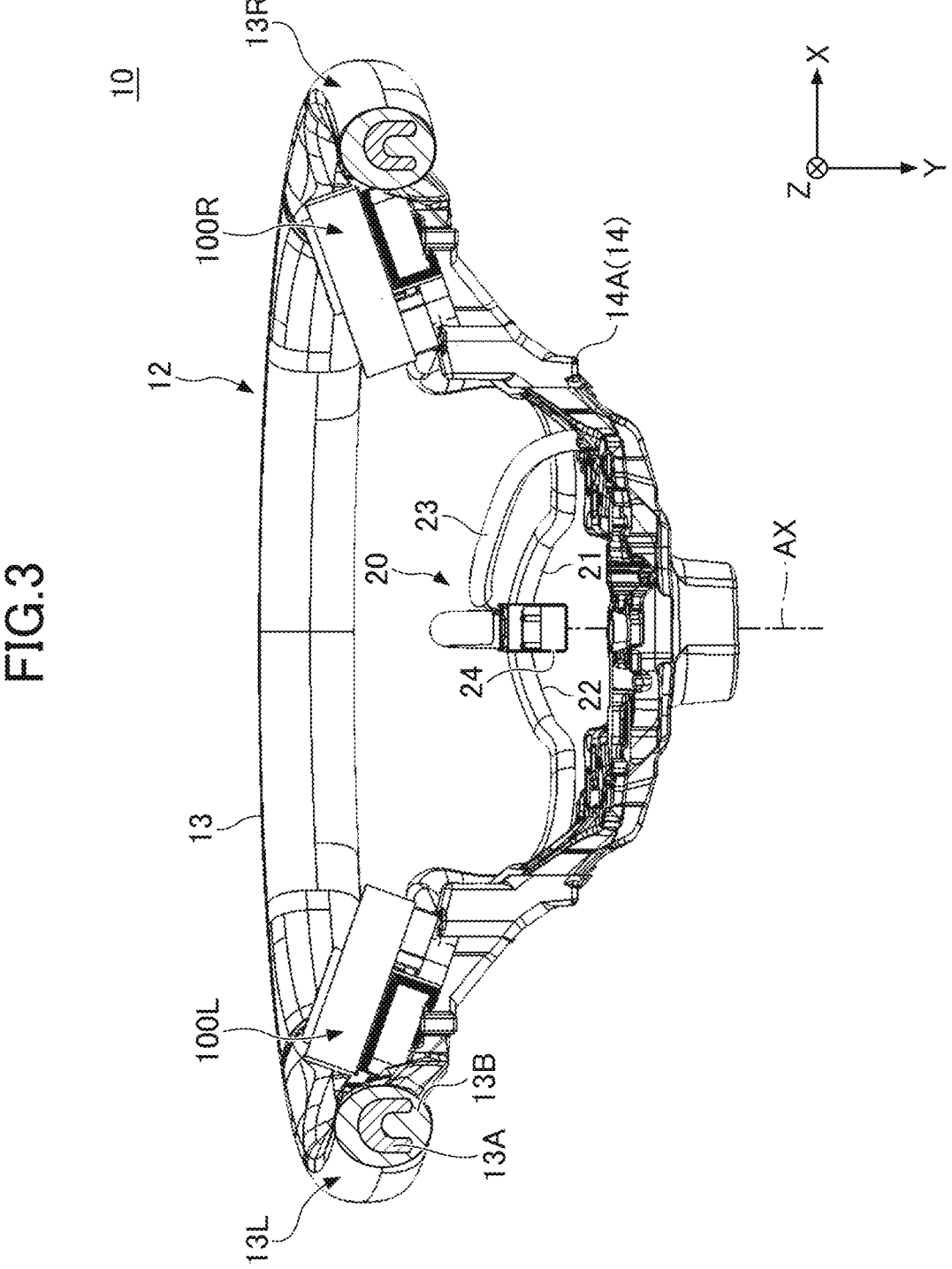
FIG. 3 is a cross-sectional view of the steering device according to one embodiment as taken along line A-A in FIG. 1.
Figure 4:
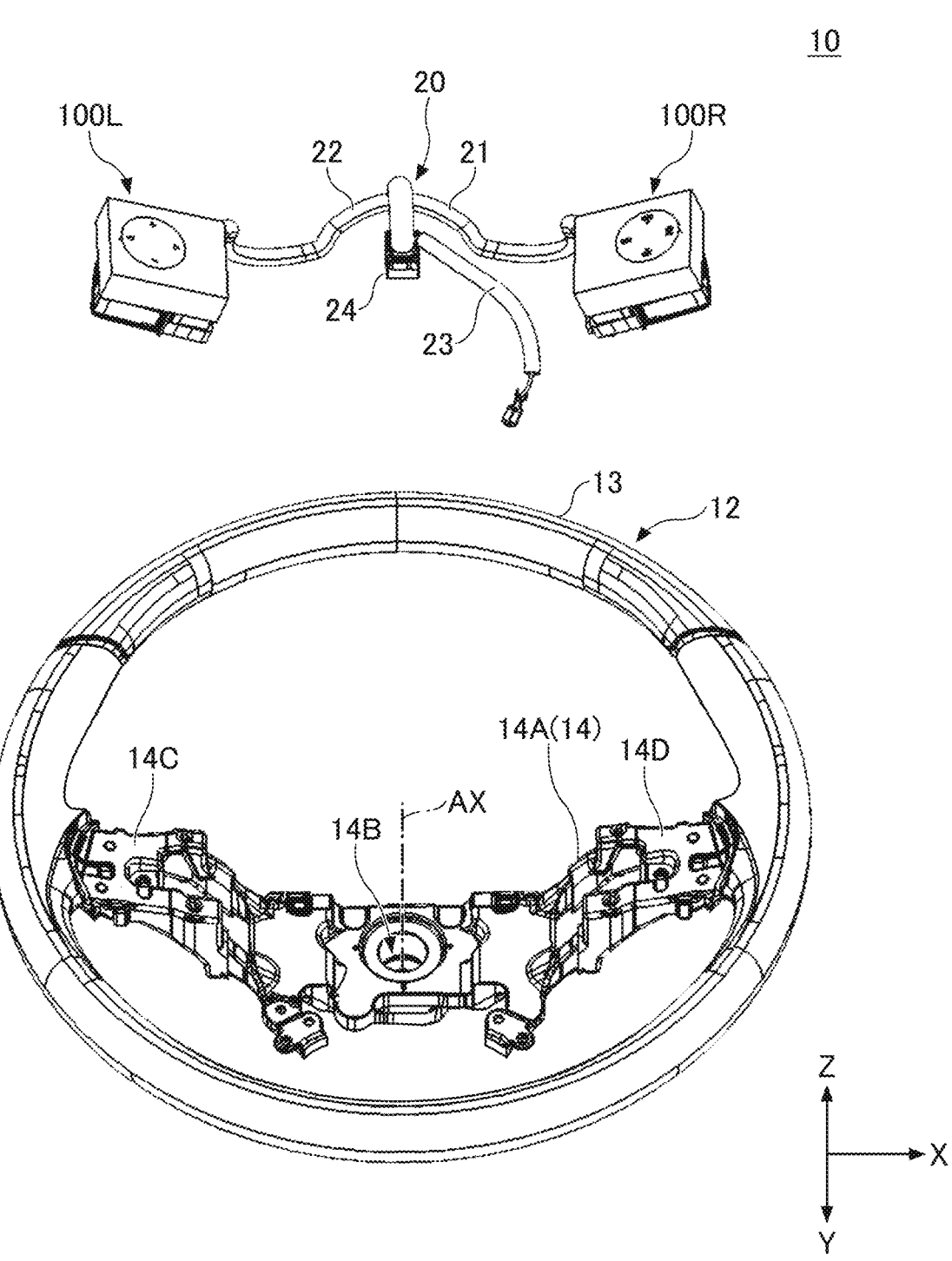
FIG. 4 is an exploded perspective view of the steering device according to one embodiment.

FIG. 1 is a plan view of a steering device 10 according to one embodiment. FIG. 2 is a perspective view of an external appearance of the steering device 10 according to one embodiment. FIG. 3 is a cross-sectional view of the steering device 10 according to one embodiment as taken along line A-A in FIG. 1. FIG. 4 is an exploded perspective view of the steering device 10 according to one embodiment.

In the following description, for the sake of convenience, an X-axis direction will be referred to as a leftward-rightward direction, a Y-axis direction will be referred to as a frontward-rearward direction, and a Z-axis direction will be referred to as an upward-downward direction. Here, a positive X-axis direction will be referred to as the rightward direction, a positive Y-axis direction will be referred to as the frontward direction, and a positive Z-axis direction will be referred to as the upward direction. These indicate a relative positional relationship in the device, and are not intended to limit an installation direction or operation direction of a device. All devices having the same relative positional relationship in the devices are included in the scope of the present disclosure even if the installation direction or operation direction thereof differs.

The steering device 10 as illustrated in FIG. 1 is provided in a cabin of a vehicle, such as an automobile or the like, and is used for operating a steering wheel and various switches of the vehicle.

As illustrated in FIG. 1 and FIG. 2, the steering device 10 includes a steering wheel 12, a switch unit 100L, a switch unit 100R, and a connection portion 20.

The steering wheel 12 includes a rim portion 13 and a spoke portion 14. The rim portion 13 is an annular part configured to be gripped by an operator with the fingers of his or her hands for operating the steering wheel. As illustrated in FIG. 3, a cross-sectional configuration of the rim portion 13 includes: a rim core metal portion 13A that is formed of a metal and disposed in a center portion; and a covering portion 13B that is formed of a resin (e.g., urethane) and covers an outer surface of the rim core metal portion 13A. A region on the leftward side (negative X-axis side) of the rim portion 13 is a gripping portion 13L gripped by the operator with the fingers of his or her left hand. A region on the rightward side (positive X-axis side) of the rim portion 13 is a gripping portion 13R gripped by the operator with the fingers of his or her right hand.

The spoke portion 14 includes a spoke core metal portion 14A. The spoke core metal portion 14A is a portion that is formed of a metal and provided inward of the steering wheel 12 so as to extend in the leftward-rightward direction (X-axis direction). A leftward (negative X-axis side) end of the spoke core metal portion 14A is connected to the rim core metal portion 13A in a region of the gripping portion 13L of the rim portion 13. A rightward (positive X-axis side) end of the spoke core metal portion 14A is connected to the rim core metal portion 13A in a region of the gripping portion 13R of the rim portion 13. Thereby, the spoke core metal portion 14A supports the rim portion 13 from the inner side. In addition, the spoke core metal portion 14A has a shape in which a center portion thereof is recessed toward the rearward side (positive Y-axis side) and is fixed to a steering shaft (not illustrated) inserted into a through hole 14B with a nut (not illustrated) or the like, the through hole 14B being provided in the center portion (on a center axis AX). Thereby, the spoke core metal portion 14A rotates together with the steering wheel 12 in accordance with an operation of the steering wheel, and enables the steering shaft to rotate about the center axis AX. The spoke core metal portion 14A is formed of a metallic material and formed integrally with the rim core metal portion 13A of the rim portion 13. As illustrated in FIG. 4, a leftward end of the spoke core metal portion 14A is provided with an installation surface 14C that faces the operator's side (negative Y-axis side) and in which the switch unit 100L is installed. Also, a rightward end of the spoke core metal portion 14A is provided with an installation surface 14D that faces the operator's side (negative Y-axis side) and in which the switch unit 100R is installed. Although not illustrated, in practice, the spoke core metal portion 14A is covered with functional components, such as a resin cover, a horn, and the like.

The switch units 100L and 100R are installed in the spoke core metal portion 14A for performing various switching operations. The switch unit 100L is installed in the installation surface 14C at the leftward end of the spoke core metal portion 14A. The switch unit 100R is installed in the installation surface 14D at the rightward end of the spoke core metal portion 14A. The switch units 100L and 100R have approximately rectangular shapes as viewed from the negative Y-axis side and have bilaterally symmetrical shapes with respect to a plane passing through the center axis AX. The surface of each of the switch units 100L and 100R on the operator's side (negative Y-axis side) is an operation surface 100A on which various switching operations are performed. In the present embodiment, the switch units 100L and 100R have bilaterally symmetrical rectangular shapes and are both provided with tilting-type operation knobs 104 to enable press-input operations in four directions. However, this is by no means a limitation. The switch units 100L and 100R may have asymmetrical shapes instead of the rectangular shape, and also, desired input methods, such as a push switch, a toggle switch, or the like, may be combined as an input method.

The switch unit 100L is provided near the gripping portion 13L of the rim portion 13, and can detect, without contact, the fingers of the left hand of the operator that is gripping the region of the gripping portion 13L. The switch unit 100R is provided near the gripping portion 13R of the rim portion 13, and can detect, without contact, the fingers of the right hand of the operator that is gripping the region of the gripping portion 13R.

Figure 7:
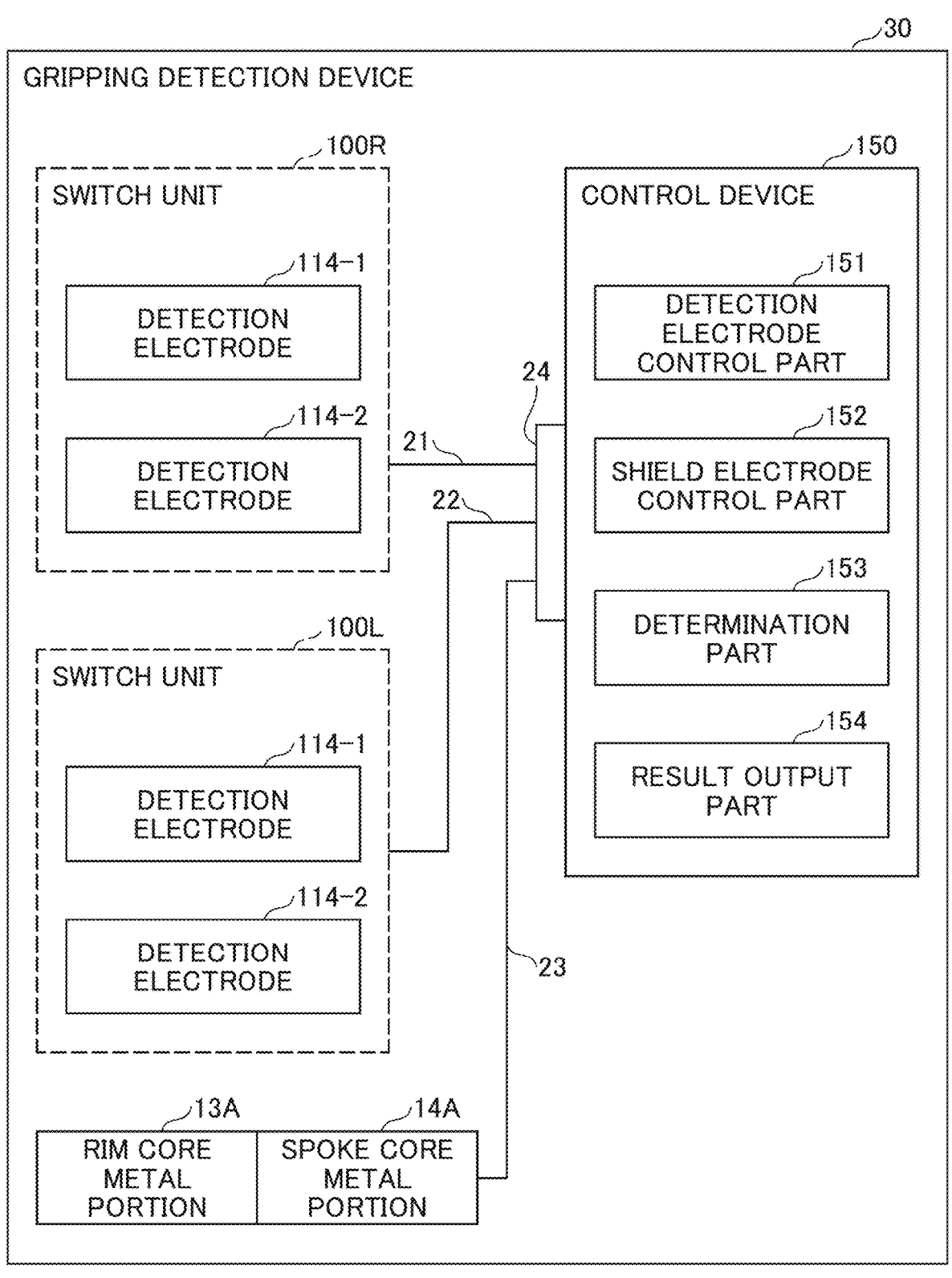
FIG. 7 is a diagram illustrating a functional configuration of a control device included in a gripping detection device according to one embodiment.

The connection portion 20 is provided for electrically connecting the switch units 100L and 100R and the spoke core metal portion 14A, to a control device 150 (see FIG. 7). The connection portion 20 includes a first cable 21, a second cable 22, a third cable 23, and a connector 24. The first cable 21 makes a connection between a terminal (not illustrated) of the switch unit 100R and the connector 24. The second cable 22 makes a connection between a terminal (not illustrated) of the switch unit 100L and the connector 24. The third cable 23 is fixed at one end thereof to the spoke core metal portion 14A through screw fastening or the like, and makes a connection between the spoke core metal portion 14A and the connector 24. The connector 24 is connected to the control device 150, thereby collectively connecting the first cable 21, the second cable 22, and the third cable 23 to the control device 150.

Configuration of Switch Unit 100

Figure 5:
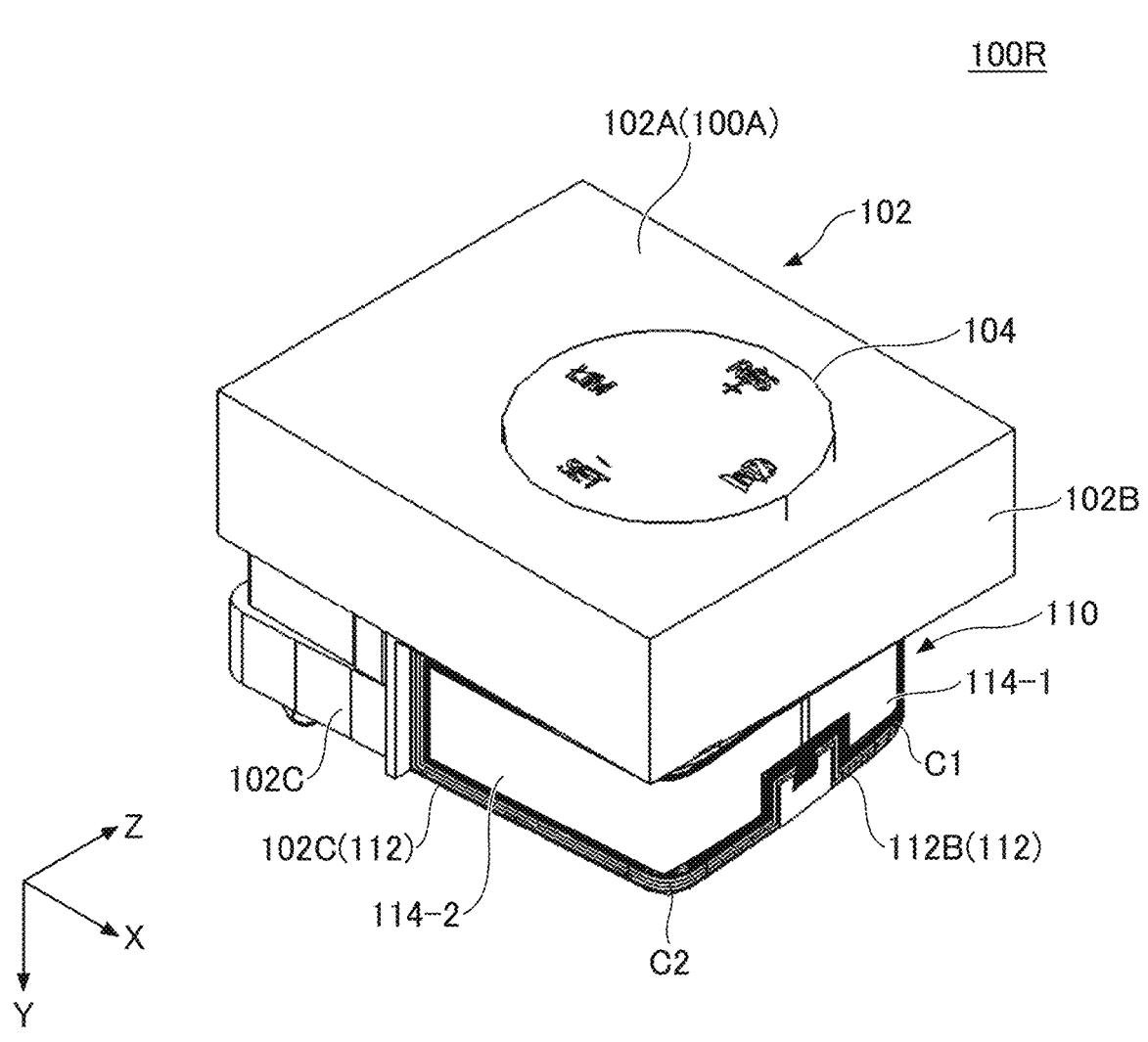
FIG. 5 is a perspective view of an external appearance of a switch unit according to one embodiment.
Figure 6:
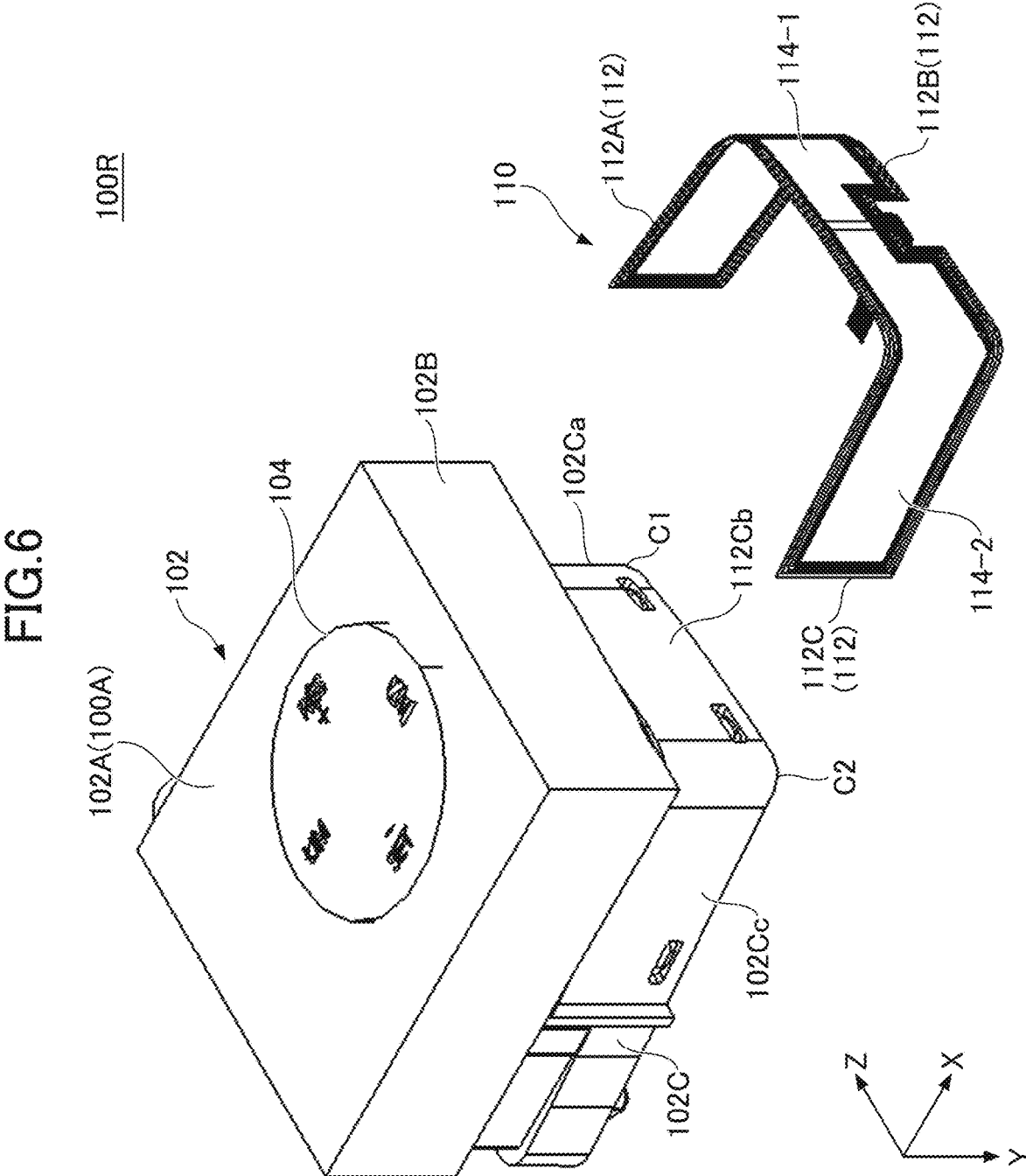
FIG. 6 is an exploded perspective view of the switch unit according to one embodiment.

First, the switch unit 100R will be described. FIG. 5 is a perspective view of an external appearance of the switch unit 100R according to one embodiment. FIG. 6 is an exploded perspective view of the switch unit 100R according to one embodiment.

As illustrated in FIG. 5 and FIG. 6, the switch unit 100R includes a casing 102, an operation knob 104, and a capacitive sensor part 110.

The casing 102 is a resin-made and container-shaped member having a hollow structure. The casing 102 has an approximately rectangular parallelepiped shape. A surface 102A of the casing 102 facing a user is the operation surface 100A on which various switch operations are performed. The surface 102A is provided with the operation knob 104 on which switching operations are performed. The interior of the casing 102 is provided with: a circuit board; a switch element mounted on the circuit board; and an actuator configured to press the switch element in response to an operation of the operation knob 104 (not illustrated). The casing 102 includes an upper casing 102B and a lower casing 102C that are combined together. Each of the upper casing 102B and the lower casing 102C has a rectangular parallelepiped shape that is thinner in the Y-axis direction. However, in a plane view from the operator's side (negative Y-axis side), the lower casing 102C has a rectangular shape that is slightly smaller than that of the upper casing 102B.

The capacitive sensor part 110 is a sheet-shaped sensor provided for detecting, without contact, gripping by the operator of the gripping portion 13R on the rightward side of the rim portion 13 with the fingers of his or her hand by a capacitive method that detects the gripping as a capacitance of the fingers. The capacitive sensor part 110 includes a flexible substrate 112, a first detection electrode 114-1, and a second detection electrode 114-2, which are provided on the flexible substrate 112.

The flexible substrate 112 is a resin-made and sheet-shaped member that is bendable and insulative. The flexible substrate 112 has a shape along three side surfaces of the lower casing 102C by being bent at a right angle at two places. Specifically, the flexible substrate 112 includes a first plane 112A, a second plane 112B, and a third plane 112C. That is, the flexible substrate 112 is bent at an approximately right angle at the two places, i.e., at the boundary between the first plane 112A and the second plane 112B, and at the boundary between the second plane 112B and the third plane 112C.

The first plane 112A is disposed to cover the lower casing 102C from an approximately middle position of a side surface 102Ca on the upper side (positive Z-axis side) to a first corner C1. The second plane 112B is disposed to cover the lower casing 102C from the first corner C1 to a second corner C2 of a rightward (positive X-axis side) side surface 102Cb. The third plane 112C is disposed to cover the lower casing 102C from an approximately middle position of a side surface 102Cc on the lower side (negative Z-axis side) to the second corner C2.

The first detection electrode 114-1 is bent at a right angle and disposed along the first plane 112A and the second plane 112B from the first plane 112A of the flexible substrate 112 to the middle position of the second plane 112B of the flexible substrate 112. That is, the first detection electrode 114-1 is bent at a right angle and disposed along the first corner C1 that is located on the upper side (positive Z-axis side) and the rightward side (positive X-axis side) of the lower casing 102C (an example of "one corner of a pair of corners facing the rim portion"). As a result, the first detection electrode 114-1 can perform hover detection of the capacitance of the fingers of the right hand of the operator that are located in proximity to the upper side (positive Z-axis direction) and the rightward side (positive X-axis direction) of the casing 102. That is, the first detection electrode 114-1 can detect the fingers of the operator that is gripping a region of the gripping portion 13R on the upper side (positive Z-axis side) (a region closer to one of the corners).

The second detection electrode 114-2 is bent at a right angle and disposed along the third plane 112C and the second plane 112B from the third plane 112C of the flexible substrate 112 to the middle position of the second plane 112B of the flexible substrate 112. That is, the second detection electrode 114-2 is bent at a right angle and disposed along the second corner C2 that is located on the lower side (negative Z-axis side) and the rightward side (positive X-axis side) of the lower casing 102C (an example of "the other corner of the pair of corners facing the rim portion"). As a result, the second detection electrode 114-2 can perform hover detection of the capacitance of the fingers of the right hand of the operator that are located in proximity to the lower side (negative Z-axis direction) and the rightward side (positive X-axis direction) of the casing 102. That is, the second detection electrode 114-2 can detect the fingers of the operator that is gripping a region of the gripping portion 13R on the lower side (negative Z-axis side) (a region closer to the other corner).

The detection electrodes 114-1 and 114-2 are provided integrally with the switch unit 100R provided in the spoke portion 14 of the steering wheel 12, and are provided near a connection region between the rim portion 13 and the spoke portion 14 of the steering wheel 12. As the detection electrodes 114-1 and 114-2, for example, a thin-film conductor, such as ITO (Indium Tin Oxide), IZO (Indium Zinc Oxide), or a metal film (e.g., silver, copper, or a composite material of aluminum and molybdenum) is used.

The capacitive sensor part 110 is bonded to the three side surfaces of the lower casing 102C with given bonding means (e.g., double-sided tape or the like) on a surface of the flexible substrate 112 facing the lower casing 102C.

Although the configuration of the switch unit 100R has been described above, the configuration of the switch unit 100L is approximately symmetrical to the configuration of the switch unit 100R and is basically the same as the configuration of the switch unit 100R.

That is, in the switch unit 100L, the first detection electrode 114-1 is bent at an approximately right angle and disposed along the first corner C1 that is located on the upper side (positive Z-axis side) and the leftward side (negative X-axis side) of the lower casing 102C (an example of "one of a pair of corners facing the rim portion"). As a result, in the switch unit 100L, the first detection electrode 114-1 can perform hover detection of the fingers of the left hand of the operator that are located in proximity to the upper side (positive Z-axis direction) and the leftward side (negative X-axis direction) of the casing 102. That is, in the switch unit 100L, the first detection electrode 114-1 can detect the fingers of the operator that is gripping a region of the gripping portion 13L on the upper side (positive Z-axis side) (a region closer to one of the corners).

Also, in the switch unit 100L, the second detection electrode 114-2 is bent at a right angle and disposed along the second corner C2 that is located on the lower side (negative Z-axis side) and the leftward side (negative X-axis side) of the lower casing 102C (an example of "the other corner of the pair of corners facing the rim portion"). As a result, in the switch unit 100L, the second detection electrode 114-2 can perform hover detection of the fingers of the left hand of the operator that are located in proximity to the lower side (negative Z-axis direction) and the leftward side (negative X-axis direction) of the casing 102. That is, in the switch unit 100L, the second detection electrode 114-2 can detect the fingers of the operator that is gripping a region of the gripping portion 13L on the lower side (negative Z-axis side) (a region closer to the other corner).

Functional Configuration of Control Device 150

FIG. 7 is a diagram illustrating a functional configuration of the control device 150 included in the gripping detection device 30 according to one embodiment. The gripping detection device 30 according to one embodiment is a device configured to determine presence or absence of the fingers of the hand of the operator that is gripping the rim portion 13 (the gripping portions 13L and 13R) of the steering wheel 12 based on a hover detection result obtained by the capacitive sensor part 110, and output a determination result.

As illustrated in FIG. 7, the gripping detection device 30 according to one embodiment includes the control device 150 and the detection electrodes 114-1 and 114-2 for each of the switch units 100L and 100R.

The control device 150 is electrically connected to each of the detection electrodes 114-1 and 114-2 of the switch unit 100R through the first cable 21 and the connector 24.

The control device 150 is electrically connected to each of the detection electrodes 114-1 and 114-2 of the switch unit 100L through the second cable 22 and the connector 24.

The control device 150 is electrically connected to the rim core metal portion 13A through the spoke core metal portion 14A, the third cable 23, and the connector 24.

As illustrated in FIG. 7, the control device 150 includes a detection electrode control part 151, a shield electrode control part 152, a determination part 153, and a result output part 154.

The detection electrode control part 151 is configured to detect change in the capacitance of the detection electrodes 114-1 and 114-2. Specifically, the detection electrode control part 151 applies an AC voltage of a sine wave to the detection electrodes 114-1 and 114-2 as a drive signal, thereby driving the detection electrodes 114-1 and 114-2. Then, the detection electrodes 114-1 and 114-2 detect change in the current value of a current flowing through the detection electrodes 114-1 and 114-2 as the change in the capacitance.

The detection electrodes 114-1 and 114-2 included in the switch unit 100R are provided near the gripping portion 13R so as to face the gripping portion 13R. Therefore, when the operator grips the gripping portion 13R with the fingers of his or her right hand, the fingers of the operator's right hand are located in proximity to the detection electrodes 114-1 and 114-2 of the switch unit 100R. As a result, the detection electrodes 114-1 and 114-2 of the switch unit 100R are capacitively coupled with the fingers of the operator's right hand, resulting in changing the current value of the current flowing through the detection electrodes 114-1 and 114-2. Thereby, the detection electrodes 114-1 and 114-2 of the switch unit 100R can perform hover detection (contactless detection) of the fingers of the operator's right hand. Because the detection electrodes 114-1 and 114-2 of the switch unit 100R have a shape that is bent at an approximately right angle as described above, the hover detection of the fingers of the operator's right hand is possible in a range of approximately ±30° in the gripping portion 13R from the 90-degree position of the rim portion 13 (positive X-axis side).

The detection electrodes 114-1 and 114-2 included in the switch unit 100L are provided near the gripping portion 13L so as to face the gripping portion 13L. Therefore, when the operator grips the gripping portion 13L with the fingers of his or her left hand, the fingers of the operator's left hand are located in proximity to the detection electrodes 114-1 and 114-2 of the switch unit 100L. As a result, the detection electrodes 114-1 and 114-2 of the switch unit 100L are capacitively coupled with the fingers of the operator's left hand, resulting in changing the current value of the current flowing through the detection electrodes 114-1 and 114-2. Thereby, the detection electrodes 114-1 and 114-2 of the switch unit 100L can perform hover detection (contactless detection) of the fingers of the operator's left hand. Because the detection electrodes 114-1 and 114-2 of the switch unit 100L have a shape that is bent at an approximately right angle as described above, the hover detection of the fingers of the operator's left hand is possible in a range of approximately ±30° in the gripping portion 13L from the 270-degree position of the rim portion 13 (negative X-axis side).

The shield electrode control part 152 generates an active shield signal and outputs the active shield signal to the rim core metal portion 13A through the connector 24, the third cable 23, and the spoke core metal portion 14A. Thus, the shield electrode control part 152 drives the rim core metal portion 13A as an active shield electrode. The active shield signal is, for example, a signal having a waveform synchronized with the drive signal applied from the detection electrode control part 151 to the detection electrodes 114-1 and 114-2 (i.e., an AC voltage of a sine wave). When the rim core metal portion 13A is driven as the active shield electrode, the capacitance value does not increase due to the presence of the rim core metal portion 13A, and components of noise applied from the rim core metal portion 13A to the detection electrodes 114-1 and 114-2 can be removed. That is, possible increments in the capacitance and components of noise derived from the rim core metal portion 13A can be removed from the capacitance detected by the detection electrodes 114-1 and 114-2 (see FIG. 8A and FIG. 8B described below).

The determination part 153 is configured to determine the presence or absence of the fingers of the operator that is gripping the gripping portions 13L and 13R based on the change in the capacitance in the detection electrodes 114-1 and 114-2 detected by the detection electrode control part 151.

For example, the determination part 153 determines that the fingers of the right hand of the operator that is gripping the gripping portion 13R are present when the difference in capacitance in the detection electrodes 114-1 and 114-2 included in the switch unit 100R exceeds a predetermined threshold th. By the presence of the spoke portion 14, the fingers may be present only either on the upper side (positive Z-axis direction) or on the lower side (negative Z-axis direction) of the gripping portion 13R. Therefore, the determination part 153 may determine that the fingers of the operator's right hand are present when the value of measurement or the amount of change of the detection electrode 114-1, the detection electrode 114-2, or both exceed a predetermined threshold.

Conversely, the determination part 153 determines that the fingers of the right hand of the operator that is gripping the gripping portion 13R are absent when the difference in capacitance in the detection electrodes 114-1 and 114-2 included in the switch unit 100R is less than the predetermined threshold th.

Also, for example, the determination part 153 determines that the fingers of the left hand of the operator that is gripping the gripping portion 13L are present when the difference in capacitance in the detection electrodes 114-1 and 114-2 included in the switch unit 100L exceeds a predetermined threshold th.

Conversely, the determination part 153 determines that the fingers of the left hand of the operator that is gripping the gripping portion 13L are absent when the difference in capacitance in the detection electrodes 114-1 and 114-2 included in the switch unit 100L is less than the predetermined threshold th.

As the threshold th, a suitable value determined in advance by an actual machine test, simulation, or the like is used. As described above, because the control device 150 drives the rim core metal portion 13A as the active shield electrode, the capacitance detected by the detection electrodes 114-1 and 114-2 is a value obtained by removing the capacitance derived from the rim core metal portion 13A and the components of noise derived from the rim core metal portion 13A. Therefore, in the present embodiment, by use of the active shield electrode, the value obtained by removing the capacitance derived from the rim core metal portion 13A and the components of noise derived from the rim core metal portion 13A is used as the threshold th. Thus, the value used as the threshold th is lower than the existing configuration without using the active shield electrode.

The result output part 154 is configured to output the determination result obtained by the determination part 153 (i.e., the presence or absence of the fingers of the operator that is gripping the gripping portions 13L and 13R) to the exterior (e.g., a device configured to execute a process in accordance with the determination result obtained by the determination part 153).

A control process in the control device 150 is realized, for example, by a computer (e.g., an IC (Integrated Circuit)) including a processor (e.g., a CPU), a storage medium (e.g., a ROM (Read Only Memory), a RAM (Random Access Memory), an SSD (Solid State Drive), or the like), an external interface, and the like. For example, the control process in each of the functional parts of the control device 150 as illustrated in FIG. 7 is realized by the processor executing programs stored in the storage medium in the control device 150.

Comparative Example

Figure 8A:
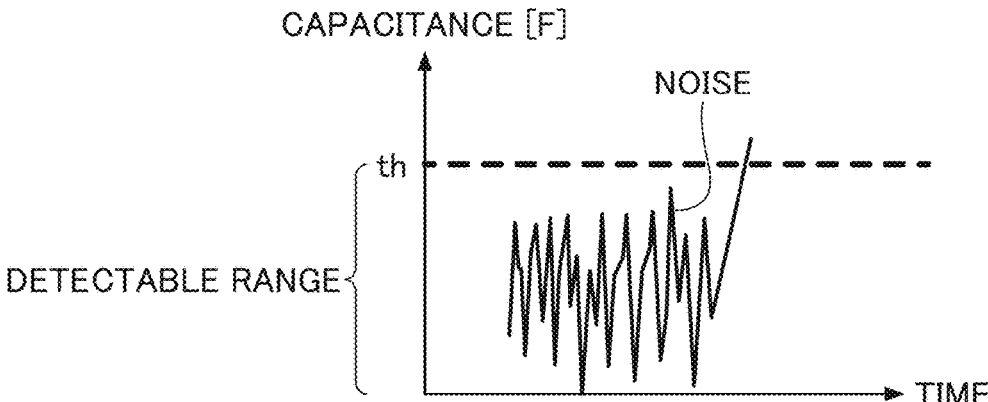
FIG. 8A is a graph illustrating a comparative example of a capacitance detected by the gripping detection device according to one embodiment.
Figure 8B:
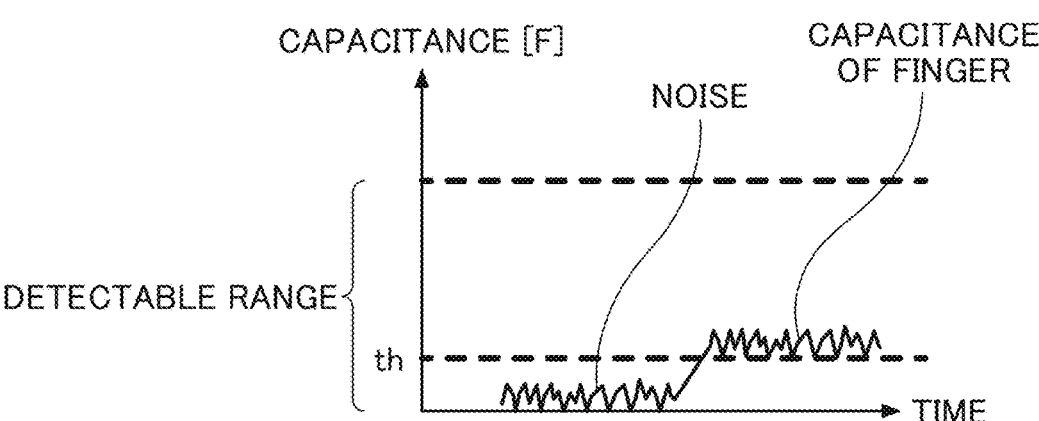
FIG. 8B is a graph illustrating a comparative example of a capacitance detected by the gripping detection device according to one embodiment.

FIG. 8A and FIG. 8B are graphs illustrating a comparative example of the capacitance detected by the gripping detection device 30 according to one embodiment. FIG. 8A is a graph illustrating an example of the capacitance detected by an existing gripping detection device without including an active shield electrode. FIG. 8B is a graph illustrating an example of the capacitance detected by the gripping detection device 30 according to one embodiment.

As illustrated in FIG. 8A, in the existing gripping detection device without including the active shield electrode, the capacitance derived from the rim core metal portion and the components of noise derived from the rim core metal portion are applied to the detection electrode. As a result, the capacitance detected by the detection electrode includes the capacitance and components of noise derived from the rim core metal portion. A sensor has a detectable range in which an output value does not change, or saturates, even by the application of a capacitance having a quantity that is equal to or more than a predetermined quantity. Even if a threshold th for determining that the fingers have approached is set near the detectable range, the threshold th is exceeded even by a slight increase in capacitance when the capacitance and components of noise derived from the rim core metal portion are included. Therefore, the existing gripping detection device cannot detect the fingers of the operator that is gripping the rim portion of the steering wheel with high accuracy. In other words, it would be quite challenging to increase detection accuracy because the components of capacitance derived from the approach of the fingers are smaller than the components of unnecessary capacitance (the capacitance derived from the rim core metal portion and the components of noise derived from the rim core metal portion).

Meanwhile, as illustrated in FIG. 8B, the gripping detection device 30 according to one embodiment drives the rim core metal portion 13A as the active shield electrode, and can remove the capacitance derived from the rim core metal portion 13A and the components of noise applied from the rim core metal portion 13A to the detection electrodes 114-1 and 114-2. That is, the gripping detection device 30 according to one embodiment can remove the components of noise from the capacitance detected by the detection electrodes 114-1 and 114-2, and detect only the capacitance of the operator's fingers. Therefore, the gripping detection device 30 according to one embodiment can lower the threshold th for determining detection of the fingers, and the fingers of the operator that is gripping the rim portion 13 of the steering wheel 12 can be detected with high accuracy by virtue of the margin between: the threshold th for determining detection of the fingers; and the detectable range of the sensor. In other words, the detection accuracy is readily increased because the components of the capacitance derived from the approach of the fingers are greater than the components of the unnecessary capacitance (the capacitance derived from the rim core metal portion 13A and the components of noise derived from the rim core metal portion 13A).

Example of Circuit Configuration in Gripping Detection Device 30

Figure 9:
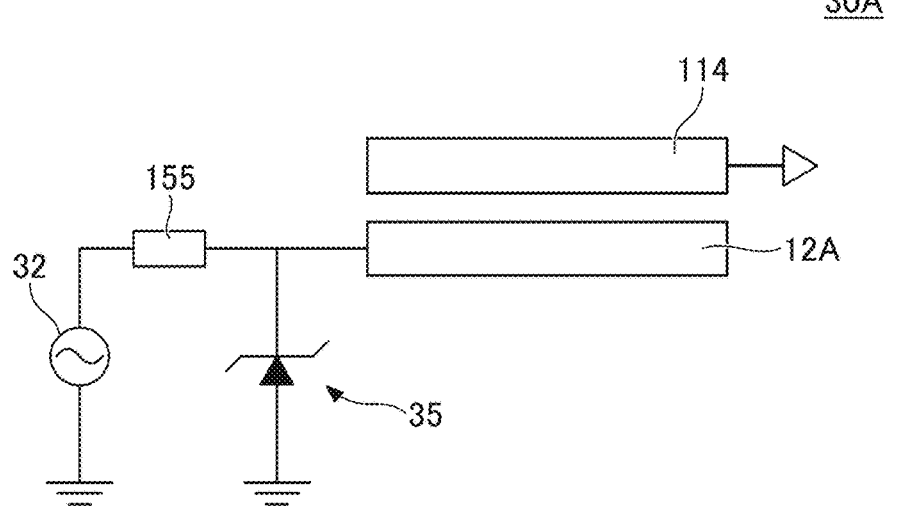
FIG. 9 is a diagram illustrating an example of a circuit configuration included in the gripping detection device according to one embodiment.
Figure 10:
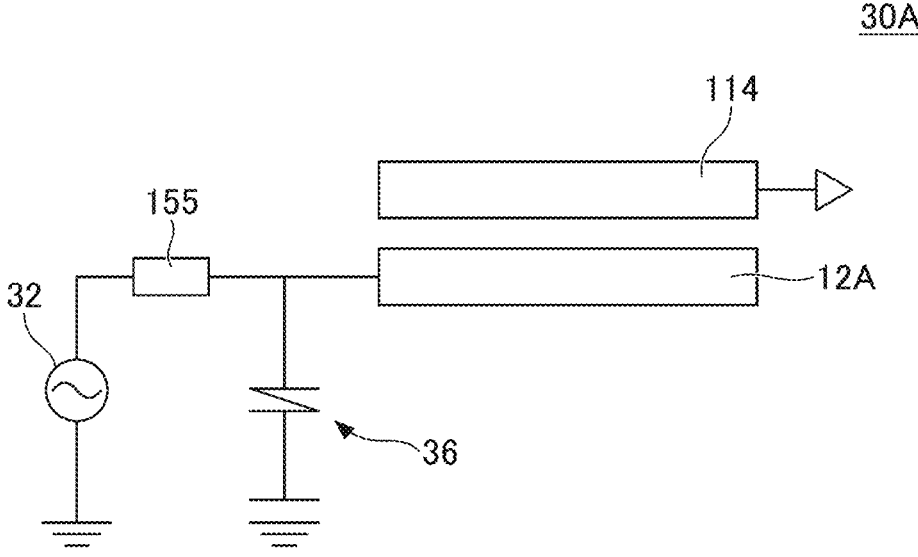
FIG. 10 is a diagram illustrating an example of the circuit configuration included in the gripping detection device according to one embodiment.
Figure 11:
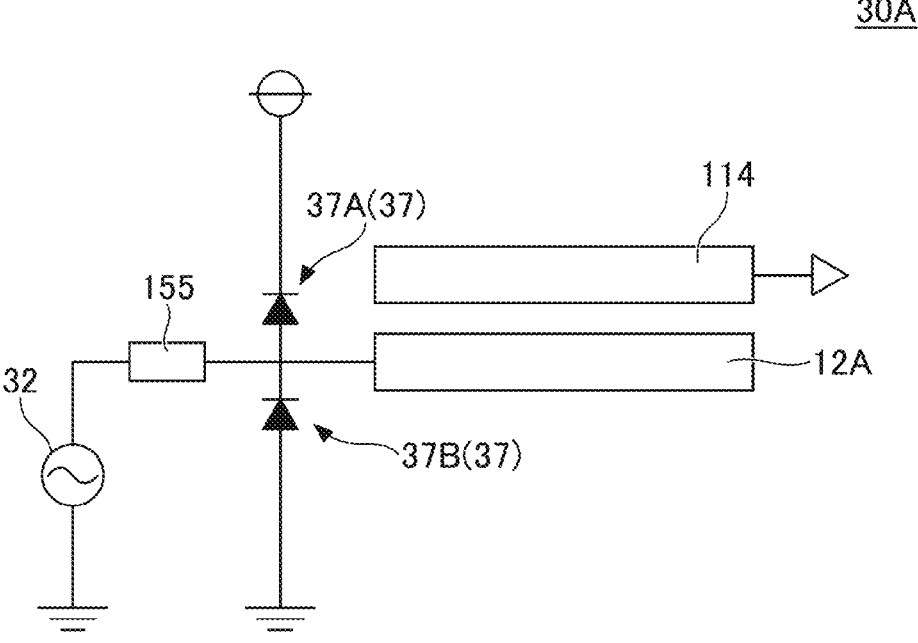
FIG. 11 is a diagram illustrating an example of the circuit configuration included in the gripping detection device according to one embodiment.

FIG. 9 to FIG. 11 are diagrams illustrating an example of a circuit configuration 30A included in the gripping detection device 30 according to one embodiment.

The circuit configuration 30A as illustrated in FIG. 9 to FIG. 11 includes a signal source 32 (the shield electrode control part 152), a voltage follower circuit 155, a detection electrode 114, and a core metal 12A of the steering wheel 12 (i.e., the rim core metal portion 13A or the spoke core metal portion 14A). The circuit configuration 30A is configured such that the active shield signal generated by the signal source 32 is supplied to the core metal 12A through the voltage follower circuit 155. When the control device 150 (the shield electrode control part 152) that is a signal source having a high output impedance is connected to a shield electrode (the core metal 12A) that is a load having a low impedance, the voltage follower circuit 155 makes the active shield signal, generated by the shield electrode control part 152, have a sufficient voltage, and outputs the active shield signal to the core metal 12A. That is, by including the voltage follower circuit 155, it is possible to stably drive the core metal 12A as the active shield electrode. Thereby, the circuit configuration 30A is configured such that the core metal 12A is driven as the active shield electrode by the active shield signal having a stable voltage, and the capacitance derived from the core metal 12A and the components of noise derived from the core metal 12A are removed from the capacitance detected by the detection electrode 114.

Also, in the circuit configuration 30A as illustrated in FIG. 9, an intermediate portion between the voltage follower circuit 155 and the spoke core metal portion 14A is grounded via a zener diode 35.

Also, in the circuit configuration 30A as illustrated in FIG. 10, an intermediate portion between the voltage follower circuit 155 and the spoke core metal portion 14A is grounded via a varistor 36.

Also, in the circuit configuration 30A as illustrated in FIG. 11, an intermediate portion between the voltage follower circuit 155 and the spoke core metal portion 14A is grounded via a clamp diode element 37 formed of diodes 37A and 37B.

With the above-described configurations, the gripping detection device 30 according to one embodiment can drive the rim core metal portion 13A as the active shield electrode while grounding the rim core metal portion 13A. Thereby, the rim core metal portion 13A can produce a sufficient noise-removing effect, and the gripping detection device 30 can take measures against ESD (electrostatic discharge).

Effects

As described above, the gripping detection device 30 according to one embodiment includes the capacitive sensor part 110 that is provided at the spoke portion 14 of the steering wheel 12 and includes the detection electrode 114 facing the rim portion 13 of the steering wheel 12; the control device 150 configured to control the capacitive sensor part 110; and the determination part 153 configured to determine presence or absence of a finger gripping the rim portion 13 based on the hover detection result obtained by the capacitive sensor part 110. The control device 150 uses the core metal of the steering wheel 12 as the shield electrode of the capacitive sensor part 110.

With this configuration, the gripping detection device 30 according to one embodiment can provide the shield electrode without providing a separate member. This can achieve an inexpensive configuration that can suppress the influence of noise on the hover detection performed by the capacitive sensor part 110. Therefore, according to the gripping detection device 30 according to one embodiment, the fingers of the operator that is gripping the rim portion 13 of the steering wheel 12 can be detected with high accuracy.

In the gripping detection device 30 according to one embodiment, the control device 150 drives the core metal of the steering wheel 12 as the active shield electrode.

Thereby, the gripping detection device 30 according to one embodiment can enhance the hover detection performance of the capacitive sensor part 110.

Also, in the gripping detection device 30 according to one embodiment, the core metal of the steering wheel 12 is an integrally provided core metal of: the rim core metal portion 13A provided at the center of the rim portion 13; and the spoke core metal portion 14A forming the spoke portion 14. The control device 150 is connected to the spoke core metal portion 14A, and drives the rim core metal portion 13A as the active shield electrode through the spoke core metal portion 14A.

Thereby, the gripping detection device 30 according to one embodiment can connect the control device 150 to the spoke core metal portion 14A, and readily connect the control device 150 to the core metal of the steering wheel 12.

Also, in the gripping detection device 30 according to one embodiment, the control device 150 drives the active shield electrode by a drive signal having a waveform synchronized with the drive signal of the detection electrode 114.

Thereby, the gripping detection device 30 according to one embodiment can remove the components of noise applied to the capacitive sensor part 110 from the active shield electrode, and thus enhance the hover detection performance of the capacitive sensor part 110.

Also, in the gripping detection device 30 according to one embodiment, the detection electrode 114 is provided near the connection region between the rim portion 13 and the spoke portion 14.

Thereby, according to the gripping detection device 30 according to one embodiment, the detection electrode 114 can perform the hover detection of the fingers of the operator that is gripping the rim portion 13 near the connection region of the spoke portion 14 with high accuracy.

In the gripping detection device 30 according to one embodiment, the detection electrode 114 is provided integrally with the switch unit 100 provided in the spoke portion 14 of the steering wheel 12.

Thereby, according to the gripping detection device 30 according to one embodiment, the detection electrode 114 can be disposed while saving a space, and the detection electrode 114 can perform the hover detection of the fingers of the operator that is gripping the rim portion 13 with high accuracy.

Also, in the gripping detection device 30 according to one embodiment, the switch unit 100 includes the pair of corners C1 and C2 at the positions facing the rim portion 13, and the capacitive sensor part 110 includes: the first detection electrode 114-1 that is bent and disposed along the first corner C1 of the pair of corners C1 and C2; and the second detection electrode 114-2 that is bent and disposed along the second corner C2 of the pair of corners.

Thereby, the gripping detection device 30 according to one embodiment can perform the hover detection of the fingers gripping the region of the rim portion 13 closer to the first corner C1 and the fingers gripping the region of the rim portion 13 closer to the second corner C2 individually and with high accuracy.

Although the embodiments of the present disclosure have been described above in detail, the present disclosure is not limited to these embodiments and can be changed or modified in various ways within the scope of the gist of the present disclosure recited in claims.

The above embodiment applies, to the rim core metal portion 13A, the signal synchronized in phase with the drive signal applied to the detection electrode, i.e., drives the rim core metal portion 13A as what is called an active shield electrode. However, this is by no means a limitation. For example, the rim core metal portion 13A may be what is called a passive shield electrode, which is set to a constant voltage, such as a ground voltage, a power supply voltage, or the like.

Also, the above embodiment drives the rim core metal portion 13A as an active shield electrode through the spoke core metal portion 14A. However, this is by no means a limitation. For example, the rim core metal portion 13A may be driven as an active shield electrode without the spoke core metal portion 14A.

According to the gripping detection device according to one embodiment, the fingers of an operator gripping the rim portion of the steering wheel can be detected with high accuracy.

What is claimed is:

1. A gripping detection device, comprising:
a capacitive sensor part that is provided at a spoke portion of a steering wheel and includes a detection electrode facing a rim portion of the steering wheel;
a control part configured to control the capacitive sensor part; and
a determination part configured to determine presence or absence of a finger gripping the rim portion based on a hover detection result obtained by the capacitive sensor part, wherein
the control part includes
a processor, and
a memory storing one or more programs, which when executed, cause the processor to:
use a core metal of the steering wheel as a shield electrode of the capacitive sensor part,
wherein
the detection electrode is provided integrally with a switch unit that is provided in the spoke portion of the steering wheel, and
wherein
the switch unit includes
a pair of corners at positions facing the rim portion, and
the capacitive sensor part includes
a first detection electrode that is the detection electrode bent and disposed along one of the pair of corners, and
a second detection electrode that is the detection electrode bent and disposed along another corner of the pair of corners.

2. The gripping detection device according to claim 1, wherein
the one or more programs, when executed, cause the processor to:
drive the core metal of the steering wheel as an active shield electrode.

3. The gripping detection device according to claim 2, wherein
the core metal of the steering wheel is an integrally provided core metal of:
a rim core metal portion provided at a center of the rim portion; and
a spoke core metal portion forming the spoke portion, wherein
the control part is connected to the spoke core metal portion, and
the one or more programs, when executed, cause the processor to:
drive the rim core metal portion as the active shield electrode through the spoke core metal portion.

4. The gripping detection device according to claim 2, wherein the one or more programs, when executed, cause the processor to:

drive the active shield electrode by a drive signal having a waveform synchronized with a drive signal of the detection electrode.

5. A steering device, comprising:

the gripping detection device of claim 1; and the steering wheel.

* * * * *